(12) United States Patent
Alt et al.

(10) Patent No.: US 12,026,080 B2
(45) Date of Patent: Jul. 2, 2024

(54) BUILD PROCESS FOR APPLICATION PERFORMANCE

(71) Applicant: Advanced Micro Devices, Inc., Santa Clara, CA (US)

(72) Inventors: Max Alt, San Francisco, CA (US); Paulo Roberto Pereira de Souza filho, Maringa (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 60 days.

(21) Appl. No.: 17/404,166

(22) Filed: Aug. 17, 2021

(65) Prior Publication Data

US 2022/0050767 A1   Feb. 17, 2022

Related U.S. Application Data

(60) Provisional application No. 63/066,497, filed on Aug. 17, 2020.

(51) Int. Cl.
| | |
|---|---|
| *G06F 11/36* | (2006.01) |
| *G06F 8/41* | (2018.01) |
| *G06F 16/23* | (2019.01) |
| *G06F 16/245* | (2019.01) |

(52) U.S. Cl.
CPC .......... *G06F 11/3612* (2013.01); *G06F 8/443* (2013.01); *G06F 16/2379* (2019.01); *G06F 16/245* (2019.01)

(58) Field of Classification Search
CPC ............ G06F 11/3612; G06F 16/2379; G06F 16/245; G06F 8/443
See application file for complete search history.

(56) References Cited

U.S. PATENT DOCUMENTS

| | | | |
|---|---|---|---|
| 10,467,131 B1* | 11/2019 | Gupta | G06F 11/3664 |
| 10,671,510 B1* | 6/2020 | Willson | G06F 11/3676 |
| 2003/0212661 A1* | 11/2003 | Avvari | G06F 11/3676 |
| 2006/0107261 A1* | 5/2006 | Vedula | G06F 9/5027 718/100 |
| 2012/0005658 A1* | 1/2012 | Bansal | G06F 11/3419 717/128 |
| 2015/0082432 A1* | 3/2015 | Eaton | G06F 9/5027 726/23 |
| 2015/0205692 A1* | 7/2015 | Seto | G06F 11/3452 702/182 |
| 2018/0321918 A1* | 11/2018 | McClory | G06F 11/3688 |
| 2019/0196945 A1* | 6/2019 | Schaude | G06F 11/3664 |
| 2020/0110691 A1* | 4/2020 | Bryant | G06F 11/3414 |
| 2022/0300280 A1* | 9/2022 | Rafey | G06F 11/3664 |

* cited by examiner

*Primary Examiner* — Ted T. Vo
*Assistant Examiner* — Brahim Bourzik
(74) *Attorney, Agent, or Firm* — Fishman Stewart PLLC

(57) ABSTRACT

Systems and methods for building applications by automatically incorporating application performance data into the application build process are disclosed. By capturing build settings and performance data from prior applications being executed on different computing systems such as bare metal and virtualized cloud instances, a performance database may be maintained and used to predict build settings that improve application performance (e.g., on a specific computing system or computing system configuration).

19 Claims, 3 Drawing Sheets

BUILD PROCESS FOR APPLICATION PERFORMANCE

CROSS-REFERENCE TO RELATED APPLICATIONS

This application claims the benefit of, and priority to, U.S. Provisional Application Ser. No. 63/066,497, filed Aug. 17, 2020, the disclosure of which is hereby incorporated herein by reference in its entirety and for all purposes.

TECHNICAL FIELD

The present disclosure generally relates to the field of computing and, more particularly, to systems and methods for improving the performance of applications in high performance computing environments.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Distributed computing was born from the necessity of processing problems that did not fit in the global memory of a single computer or that required higher amounts of computational power than that available from a single computer. Distributed computing systems have evolved to address the needs of these ever-larger processing problems. Modern distributed computing systems have multiple computers (e.g. nodes) that work in parallel for higher performance and are connected via high speed networks.

Modern high-performance applications (e.g., scientific simulation, machine learning (ML), artificial intelligence (AI), data mining) have evolved to take advantage of these distributed computing systems, and they divide their processing tasks into smaller problems that can be distributed to different nodes in the distributed computing system for execution. They often use frameworks such as MPI (Message Passing Interface) that permit execution to occur in parallel and enable nodes to pass messages to each other over the network in order to coordinate their work. Examples of distributed computing systems include high performance computing (HPC) systems and cloud computing systems.

An example development process may involve a data scientist designing an AI model, collecting data, training the AI model, validating the AI model through testing, and making changes to the AI model to increase accuracy. Once the accuracy is acceptable, the AI model is be rolled out to production. This process can be iterative and may be performed on multiple different computer systems. For example, early development may be on the data scientist's local workstation or bare metal cluster, with later stages taking place on larger virtual systems running on cloud-based systems.

Using large numbers of processors and vast amounts of memory can be expensive, particularly on cloud computing platforms. Cost are typically allocated based on the number of processors, the amount of memory and storage, and the time for which the system is used. For this reason, it is advantageous to design and configure applications so that they have the best performance possible given the particulars of the system on which they will run (e.g., bare metal systems or virtual cloud instances). Application optimization can make a significant different in the performance of an application (e.g., how long a job takes to complete), but it can be difficult, especially for non-expert users. For example, some optimizations for applications involve setting compiler flags, selecting which libraries (or library versions) to use, specifying the number of nodes/tasks/threads, etc. Many of the parameters for these optimizations are specified as part of the application build process. The process of building an application is usually managed by a build tool (e.g., make, Gradle, Ant, Maven) that coordinates and controls other programs such as compilers and linkers.

Currently, finding optimal application build parameters for performance typically involves the application developer using a tool such as VTune to instrument their application, running the application, reviewing the performance data, and then adjusting the parameters and repeating the process several times until acceptable performance is attained. This process is often time-consuming and may need to be performed again for each different computer system being targeted.

For at least these reasons, a system and method for improving application performance through build parameters is desired.

SUMMARY

An improved system and method for building applications by automatically incorporating application performance data into the application build process is contemplated. By leveraging prior application build and performance data (e.g., for different computing systems) stored in a database, build settings that improve performance may be predicted and applied.

In one embodiment, the method comprises gathering profile information for the application that is used to search an application performance database. The database comprises (i) historical profile information, historical build parameters, and historical performance data for a large number of prior applications. Based on the profile, performance data from runs of similar prior applications (or prior runs of the same application) can be used to predict which build parameters will result in improved performance. If prior performance data indicative of performance improvement exists, the corresponding build parameters can be used to identify the predicted performance improvements and recommend changes to the user's current build parameter settings. These parameter changes may for example be proposed for approval by the user, these updated build parameters can be used to build the user's application. The build process may include collecting performance data for one or more executions of the user's application, and that collected performance data can be used to update the database (e.g., if the updated parameters indicate an improvement). The update may include the gathered profile information for the user's application, the build parameters used for the user's application, and the performance data collected from running the user's application.

The performance data in the database may include data for many different computer systems and different applications (including different application versions). These may include including but not limited to bare metal systems and virtual cloud-based instances. The build parameters may for example comprise compiler flags, which libraries to use (e.g., making a library selection or recommendation from a set of known libraries), how many threads to configure, and container parameters (e.g., a first set of parameters for worker instances and a second set of parameters for controller instances for applications have a worker-controller model).

In some embodiments, the process may be automated and automatically repeated by building the application using different sets of parameters, executing each different built version, collecting performance data, and updating the performance database.

In another embodiment, the method may comprise applying a first set of build parameters to an application in a build tool, running the application on a first computing system, gathering performance data, and updating an application performance database with the first set of build parameters and the gathered performance data. The gathered performance data may be compared with prior performance data stored in the application performance database. In response to finding prior performance data in the database that is indicative of better performance, updated parameters may be passed to the build tool to improve the application's performance.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
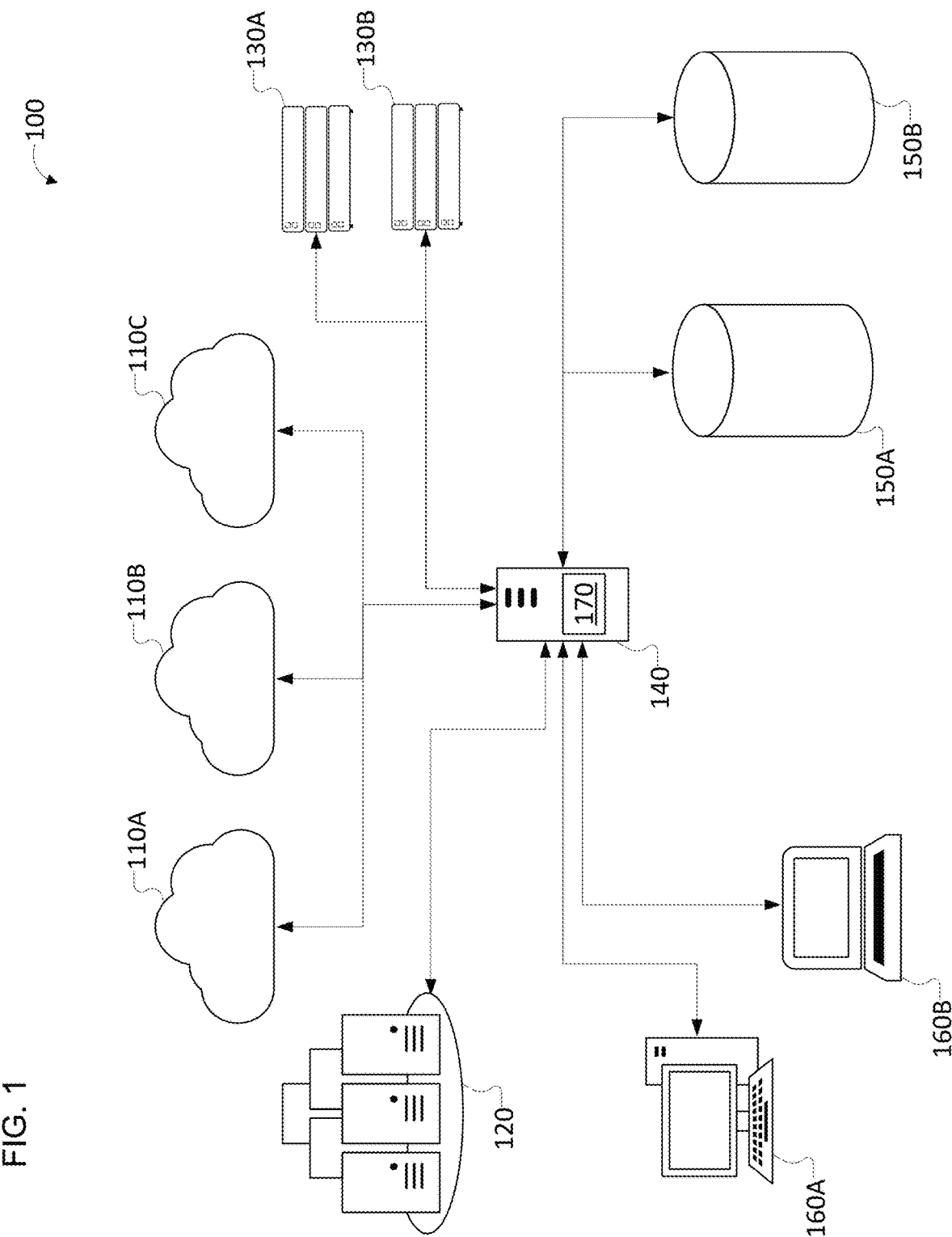
FIG. 1 is an illustration of one example of a distributed computing system.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their user devices 160A and 160B such as on-premises network-connected PCs, workstations, servers, laptops or mobile devices via a web interface.

Management server 140 is connected to a number of different computing devices via local or wide area network connections. This may include, for example, cloud computing providers 110A, 110B, and 110C. These cloud computing providers may provide access to large numbers of cloud systems with computing devices (often virtualized) with different configurations. For example, systems with a one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a datacenter 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the management server 140, partly on management server 140 and partly on other computing devices in distributed computing system 100.

The management application 170 provides an interface to users (e.g., via a web application, portal, API server or command line interface) that permits users and administrators to submit applications/jobs via their user devices 160A and 160B, such as workstations, laptops, and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to management server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be applications operating within containers (e.g. Kubernetes with Docker containers) or virtualized machines.

Unlike prior systems, management application 170 may be configured to provide build parameters such as compiler flags to a user's build tool (e.g., executing on the user's local machine 160A and 160B or on a cloud instance).

Figure 2:
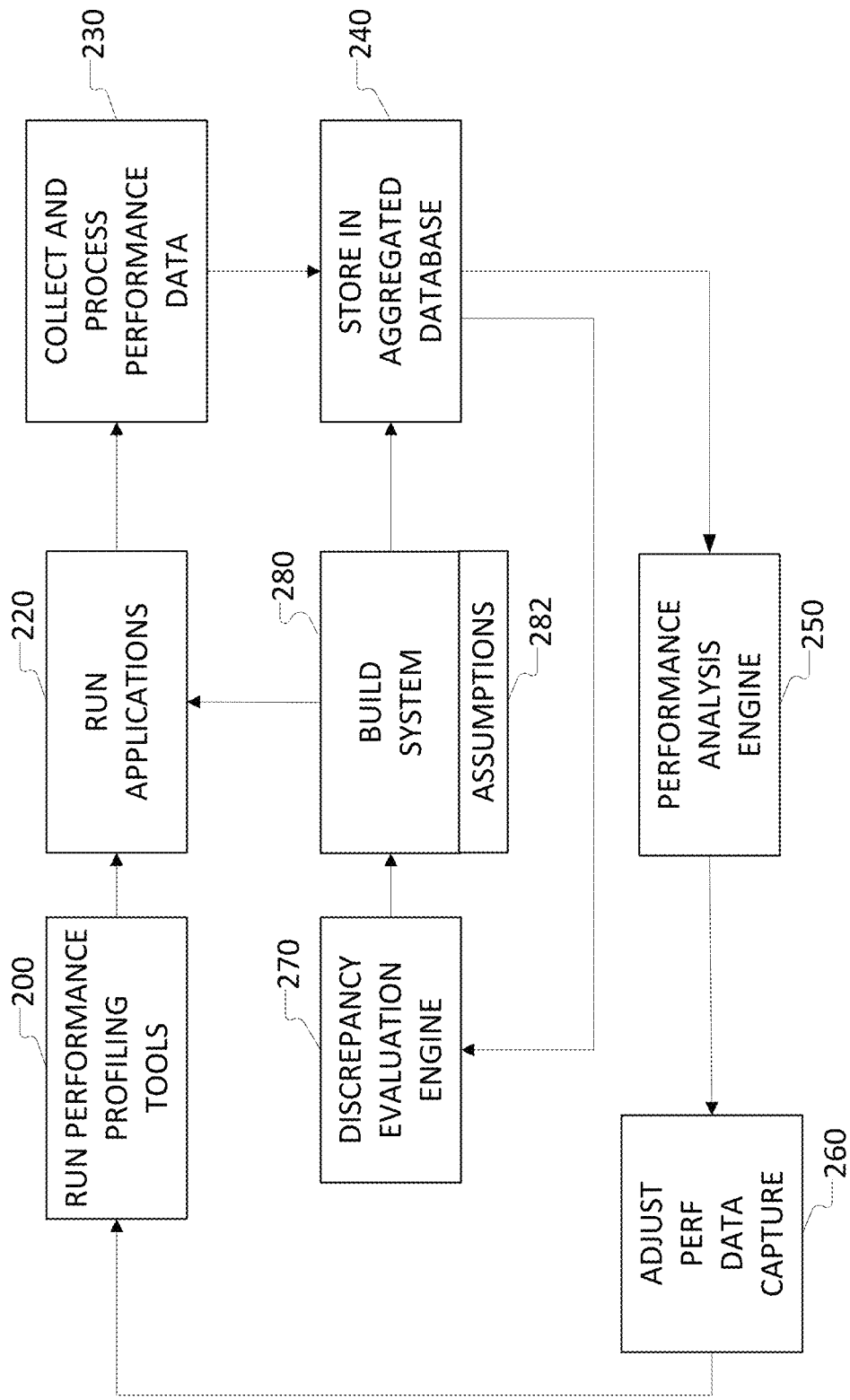
FIG. 2 is a flowchart of an example embodiment of a method for incorporating application performance data into an application build process.

Turning now to FIG. 2, a flowchart of one example method for improving application performance through intelligent build parameter updates is shown. In this embodiment, performance profiling tools (e.g., Linux perf tool) are configured to run (step 200) to measure one or more performance counters (e.g., instruction counters, CPU instructions counter, GPU instructions counter, cache miss counters, memory counters, storage counters) while an application is being executed (step 220) on a computing system. Performance profiling may also be injected into the application by the build system (by directing the compiler) to track useful performance-related information such as function calls, etc.

As the application is executing, performance data is collected and processed (step 230). As significant amounts of performance data may be generated, this processing may include filtering the data and aggregating it. In one embodiment, this may comprise creating an application fingerprint representative of the performance characteristics of the application for the particular computer system/configuration being used. The processed data is then stored in a database (step 240).

Performance data from the database may be analyzed by a performance analysis engine (step 250), which may provide feedback to the performance profiling tools, e.g., to increase or reduce the frequency of sampling if more or less data is needed, or to change which performance counters are being captured (step 260).

Data stored in the database may also be used by an assumption engine (step 270) that includes machine learning algorithms that looks for correlations between build parameters to learn from discrepancies between assumed performance and actual performance that results from different build system parameters. The assumption engine may then provide recommendations (step 282) for build-time optimizations to the build system (step 280) that are predicted to improve application performance on the target system. For example, these recommendations include picking a particular library (e.g., a library that has exhibited better performance on the target computer system) from a set of available libraries, complier flags to use, and system/container parameters.

The assumption engine may for example look for correlations in measured performance, build settings, and target/instance specifics such as data location and locality, data access latency, the number of iterations performed, probability of certain application conditions being true or false. With machine learning, the assumption engine may evolve its recommended optimal build parameters as the weighting of factors change as more data becomes available in the aggregated database. A confidence level of the parameters may be provided as well to the user so that the can factor that into their decision of whether or not to use or override the recommended build parameters.

The user may be provided with the ability to accept or override the recommendations from the assumption engine. The actual build parameters that are used for running the application are stored in the database so that they can be matched to the performance data captured for the application.

The assumption engine may also be configured to profile new applications when they are encountered by the build system. Based on this profile, it may provide recommendations based on similar applications for which it already has data stored in the database. Similarly, when a new target computer system or configuration is first encountered, build parameter recommendations may be based on the predicted best settings for the most similar computer system for which data is available. In these cases, the user may be notified that the recommendations have a lower confidence level because the application or target computer system/configuration has not been seen before.

The machine learning in the assumption engine may be used to predict which build system parameters will result in the best performance, even for applications and computing system combinations that have not been seen before the system.

Figure 3:
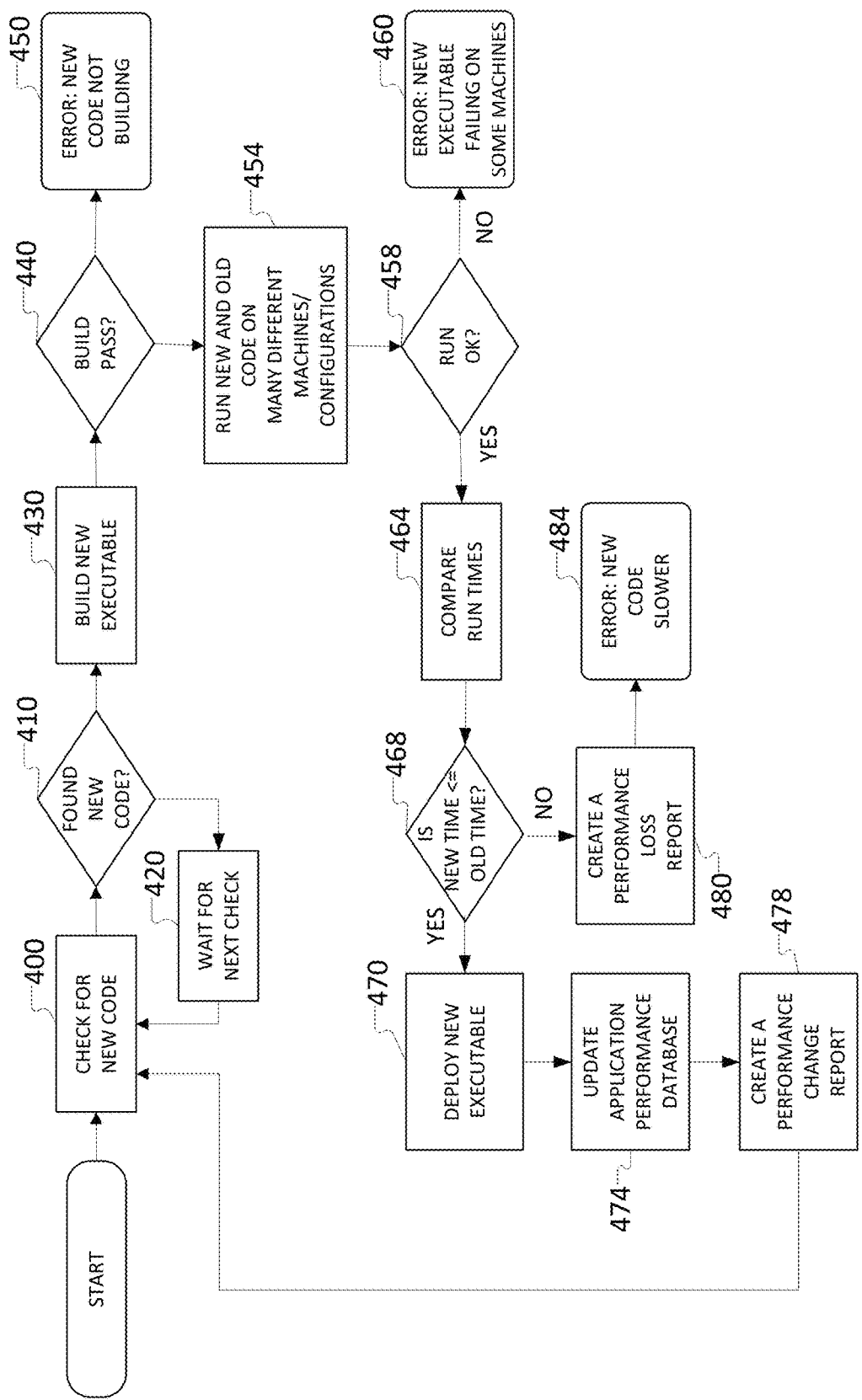
FIG. 3 is another flowchart of an example embodiment of a method for incorporating application performance data into an application build process.

Turning now to FIG. 3, a flowchart of another example method for incorporating application performance data into an application build process is shown. In this method, code changes made (e.g., updates made the user) are automatically checked for performance degradation as part of the build process. The system may be configured to automatically check for the presence of new code (step 400). This may for example be performed in response to code being checked into a version control system. In no new code is found, the optimization waits until the next code check-in (step 420). If new code is found (step 410), a new executable is built (step 430) and tested (step 440). If the executable fails testing, an error surfaced to the user (step 450). If the executable passes testing, the new executable and the prior executable are both subjected to test runs on many different machines/configurations (step 454). This may include bare metal systems (if available) and one or more different cloud system configurations (e.g., with different numbers of processors and different amounts of memory). If a test run fail to complete successfully (step 458), an error is surfaced to the user indicating which computer systems or cloud configurations had failures (step 460).

For any test runs that are completed successfully, the test execution times are compared with prior test execution times (step 464). If the new executable's execution times are the same or lower (step 468), the new executable is deployed (step 470), and a database of application performance data and corresponding build settings, and computer system configuration data is updated (step 474). A performance change report may also be generated for the user (step 478). If the new executable's execution times are not faster (step 468), a performance loss report (step 480) and error report (step 484) may be generated for the user.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments,"

"with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method comprising:
   collecting performance data of an application while the application is running;
   updating a performance database with the performance data, wherein the performance database comprises: (i) historical profile information for a set of prior applications, (ii) historical build parameters for the set of prior applications, and (iii) historical performance data for the set of prior applications;
   identifying at least one correlation between the performance data and build settings of the application, wherein identifying the at least one correlation is based on the performance database;
   providing, based on the at least one correlation, one or more build parameter changes to the build settings to optimize build time of the application, wherein the one or more build parameter changes are predicted to improve performance of the application on a target system;
   receiving a user selection of at least one of the one or more build parameter changes;
   updating the application via a build tool based on the user selection;
   collecting additional performance data of the updated application; and
   updating the performance database with the at least one of the one or more build parameter changes and the additional performance data.

2. The method of claim 1, wherein the historical performance data is for a plurality of different computer systems comprising bare metal and cloud systems.

3. The method of claim 1 further comprising discrepancies between an assumed performance of the application and an actual performance of the application, wherein providing, based on the at least one correlation, the one or more build parameter changes is further based on the discrepancies.

4. The method of claim 1, wherein the provided one or more build parameter changes comprise a compiler flag recommendation.

5. The method of claim 1, wherein the provided one or more build parameter changes comprise a library selection recommendation from a set of available libraries.

6. The method of claim 1, wherein the provided one or more build parameter changes comprise a number of threads recommendation.

7. The method of claim 1, wherein the provided one or more build parameter changes comprise a container parameter recommendation.

8. The method of claim 7, wherein the container Parameter recommendation comprises a first set of parameters for worker instances and a second set of parameters for controller instances.

9. The method of claim 1, further comprising:
checking the application for new code;
in response to finding new code:
(a) building a new executable with the new code;
(b) testing the new executable on a plurality of different computer systems;
(c) comparing the new testing run times of the application having the new code with prior testing run times of the application without the new code; and
(d) updating the database with the new testing run times.

10. The method of claim 9, wherein (d) is performed in response to the new testing run times being faster than the prior testing run times.

11. A non-transitory computer readable storage medium having instruction thereon to:
apply a first set of build parameters to an application in a build tool;
run the application on a first computing system after application of the first set of build parameters;
gather performance data from the first computing system running the application;
update an application performance database with the first set of build parameters and the performance data;
identify, based on the application performance database, at least one correlation between the performance data, prior performance data of the application, and the first set of build parameters;
provide, based on the at least one correlation, at least one updated application build parameter to a user, wherein the at least one updated application build parameter is predicted to improve performance of the application on a target system;
receive a user selection of at least one of the one updated application build parameter;
rebuild the application, via the build tool, based on the user selection;
collect additional performance data of the rebuilt application; and
update the application performance database with the user selection and the additional performance data.

12. The non-transitory computer readable storage medium of claim 11, wherein the at least one updated application build parameter comprises a compiler flag recommendation.

13. The non-transitory computer readable storage medium of claim 11, wherein the at least one updated application build parameter comprises a library selection recommendation from a set of available libraries.

14. The non-transitory computer readable storage medium of claim 11, wherein the at least one updated application build parameter comprises a number of threads recommendation.

15. The non-transitory computer readable storage medium of claim 11, wherein the at least one updated application build parameter comprises a container parameter recommendation.

16. A system comprising:
at least one non-transitory computer readable storage medium;
a management application stored on the at least one computer readable storage medium, the management application configured to:
access a database, wherein the database includes historical performance data of an application;
based on information in the database, identify a correlation among the historical performance data of the application and application build settings of the application;
provide, based on the correlation, at least one build parameter change for the application that is predicted to improve operation of the application on a target system, wherein the at least one build parameter change is at least one of a compiler flag recommendation, a recommended number of threads to configure, and a container parameters recommendation;
receive a user selection of at least one of the at least one build parameter change from a user;
rebuild the application based on the user selection;
collect additional performance data of the rebuilt application; and
update the database with the user selection and the additional performance data.

17. The system of claim 16, wherein the management application is further configured to profile a different application.

18. The system of claim 17, wherein the management application is further configured to provide a build parameter change for the different application to a user, wherein the build parameter change is predicted to improve performance of the application on a different target system.

19. The system of claim 18, wherein the build parameter change for the different application is based on predicted best build parameter settings for a similar target system, wherein the database includes data associated with the similar target system.

* * * * *